UNITED STATES PATENT OFFICE.

JOHN W. CABOT, OF JOHNSTOWN, AND SAMUEL W. VAUGHEN, OF COOPERSDALE, PENNSYLVANIA.

PROCESS OF MANUFACTURING MANGANIFEROUS METAL.

SPECIFICATION forming part of Letters Patent No. 580,765, dated April 13, 1897.

Application filed September 17, 1896. Serial No. 606,149. (No specimens.)

*To all whom it may concern:*

Be it known that we, JOHN W. CABOT, a resident of Johnstown, and SAMUEL W. VAUGHEN, a resident of Coopersdale, in the county of Cambria and State of Pennsylvania, citizens of the United States, have invented certain new and useful Improvements in the Process of Manufacturing Manganiferous Metal; and we do declare the following to be a full, clear, and exact description of the invention, such as will enable others skilled in the art to which it appertains to make and use the same.

In our Patent No. 556,457, issued March 17, 1896, we described and claimed a process of manufacturing the manganiferous metal known as "spiegeleisen" or "spiegel" from the waste products or slag produced in the Bessemer-steel practice and known as "converter-slag" or "converter-cinder," which process consists in reducing this slag in a blast or other furnace mixed with limestone and coke or other carbonaceous fuel. In the practice of this process we have found that it will sometimes produce a metal richer in manganese than the grade which we desire to produce, owing to the fact that the converter-slag is rich in manganese to a variable degree, running so high in some instances as to destroy that ratio between the content of manganese and the content of iron which is found desirable for the production of that grade of metal which is most generally used.

In trade the different grades of spiegel are designated by the per cent. of manganese which they contain, as "eight per cent.," "ten per cent.," "fifteen per cent.," "eighteen per cent.," &c. We usually require a spiegel of about fifteen per cent., for the reason that one containing more manganese is too rich in the latter in proportion to the carbon of the steel.

The object of the present invention is therefore to provide means whereby, in the operation of producing manganiferous metal from the converter-slag, any desired grade of such product may be obtained with certainty no matter what the variation in chemical composition may be from the medium or average composition usually found.

In carrying out our improved process we prepare the charge of converter-slag, coke, and limestone in substantially the manner directed in the said patent and introduce into such charge such a proportion of iron-bearing material as will restore the desired ratio between the iron and manganese to produce when smelted a manganiferous metal of the desired grade. To produce a ten-per-cent. spiegel, this ratio we have found to be about four per cent. of iron to one per cent. of manganese; for a fifteen-per-cent. spiegel, about three per cent. of iron to one per cent. of manganese; for a twenty-per-cent. spiegel, about two per cent. of iron to one per cent. of manganese. The material which we have used to best advantage for thus lowering the manganese ratio when working with a slag containing a high per cent. of manganese is what is known to the trade as "roll-scale." In this material the proportion of iron to manganese is very high, being very nearly pure oxid of iron. We do not, however, confine ourselves to this material, but may use iron ore, "heating-cinder," or, in fact, any iron-bearing material not too high in phosphorus.

We have found in carrying out this improved process on a practical manufacturing scale that using a converter-slag, which if worked according to our said patent would produce a twenty-per-cent. spiegel, when diluted down with roll-scale or its equivalent carrying about seventy per cent. of metallic iron and using about ten per cent. of this roll-scale in the charge, a metal is produced in which the average manganese (as tested during a week's operation) is 14.5 per cent.—that is to say, ten per cent. of roll-scale reduces the grade from about twenty to about fifteen per cent. An addition of two per cent. of this material would have reduced the grade one point.

In order to produce any desired grade of metal with the average slag, it is therefore necessary to add two per cent. or thereabout of iron for every one point which it is desired to lower the grade. It may also be stated that when this material is added the proportion of coke and limestone employed may be somewhat reduced.

Having thus described our invention, what we claim as new, and desire to secure by Letters Patent, is—

1. The art or method of treating the waste product, or slag, produced in Bessemer-steel practice and known as "converter-cinder" or "converter-slag," to produce therefrom a manganiferous metal containing a given per cent. of manganese, which art or method consists in smelting together a charge of such slag containing an excess of manganese, mixed with limestone and a carbonaceous material, such as coke, and adding to the charge a material containing oxid of iron in the proportion of two per cent. of such material for each one per cent. which it is desired to lower the grade of the metal produced, substantially as specified.

2. The art or method of treating the waste product, or slag, produced in the Bessemer-steel practice and known as "converter-cinder" or "converter-slag," to produce therefrom the manganiferous metal known as "spiegeleisen," and at the same time regulating the grade of such metal, which art or method consists in first determining the content of manganese in the slag, and second smelting a charge of such slag found to contain manganese in excess, mixed with limestone and coke, and in adding to the charge the material known as "roll-scale," the proportion of such material added being about two per cent. thereof for each one per cent. which it is desired to lower the grade of the metal produced, substantially as specified.

3. The art or method of treating the waste product, or slag, produced in the Bessemer-steel practice and known as "converter-cinder" or "converter-slag," to produce therefrom the manganiferous metal known as "spiegeleisen," which art or method consists in smelting a charge of such slag carrying iron and manganese, mixed with limestone and coke, and in adding to the charge the material known as "roll-scale," substantially as described.

In testimony whereof we affix our signatures in presence of two witnesses.

JOHN W. CABOT.
SAMUEL W. VAUGHEN.

Witnesses:
JAMES B. O'CONNOR,
R. E. CRESSWELL.